(12) United States Patent
Rao et al.

(10) Patent No.: US 6,679,934 B2
(45) Date of Patent: Jan. 20, 2004

(54) NITRIDED VALVE METALS AND PROCESSES FOR MAKING THE SAME

(75) Inventors: Bhamidipaty K. D. P. Rao, deceased, late of Wyomissing, PA (US), by Kamiswari Bhamidipaty Rao, executor; Shi Yuan, King of Prussia, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/795,947

(22) Filed: Feb. 28, 2001

(65) Prior Publication Data

US 2002/0088507 A1 Jul. 11, 2002

(Under 37 CFR 1.47)

Related U.S. Application Data

(60) Provisional application No. 60/185,979, filed on Mar. 1, 2000.

(51) Int. Cl.[7] .............................. C22C 1/04; C22C 29/16
(52) U.S. Cl. ........................................... 75/245; 75/255
(58) Field of Search ..................... 75/255, 245; 148/422

(56) References Cited

U.S. PATENT DOCUMENTS

| | | | |
|---|---|---|---|
| 3,427,132 A | 2/1969 | Goon | 23/204 |
| 3,723,838 A | 3/1973 | Kumagai | 317/258 |
| 4,423,004 A | 12/1983 | Ross | 419/35 |
| 4,544,403 A | 10/1985 | Schiele et al. | 75/0.5 AB |
| RE32,260 E | 10/1986 | Fry | 75/230 |
| 4,805,074 A | 2/1989 | Harakawa et al. | 361/525 |
| 4,954,169 A | 9/1990 | Behrens | 75/228 |
| 4,968,481 A | 11/1990 | Rerat | 419/23 |
| 5,211,741 A | 5/1993 | Fife | 75/255 |

(List continued on next page.)

FOREIGN PATENT DOCUMENTS

| | | |
|---|---|---|
| DE | 19831280 | 1/2000 |
| EP | 0 402 687 B1 | 12/1990 |
| EP | 0 665 302 A2 | 8/1995 |
| EP | 0 282 291 A2 | 9/1998 |
| EP | 0 953 847 A1 | 11/1999 |
| EP | 0 984 469 A2 | 3/2000 |
| EP | 0 984 470 A2 | 3/2000 |
| JP | WO 00/36617 A1 | 6/2000 |
| WO | WO 98/37249 A1 | 8/1998 |
| WO | WO 99/57739 | 11/1999 |
| WO | WO 99/61184 | 12/1999 |
| WO | WO 00/08662 A1 | 2/2000 |
| WO | WO 00/49633 | 8/2000 |
| WO | WO 01/06525 | 1/2001 |
| WO | WO 01/12364 | 2/2001 |
| WO | WO 01/64374 A2 | 9/2001 |

OTHER PUBLICATIONS

Terrance B. Tripp, Malcolm D. Shaw, and Bonnie Cox, "*The Effects of Nitrogen on The Properties of Anodic Oxide Films on Tantalum*," pp. 317–332, (No Date).

Terrance B. Tripp, Richard M. Creasi, and Bonnie Cox, "*Tantalum Nitride: A New Substrate For Solid Electrolyte Capacitors*," pp. 256–262, (Mar. 2000).

(List continued on next page.)

Primary Examiner—Daniel J. Jenkins

(57) ABSTRACT

Nitrided valve metals are described, such as nitrided tantalum and nitrided niobium. The nitrided valve metals preferably have improved flow properties, higher Scott Densities, and/or improved pore size distribution which leads to improved physical properties of the valve metal and improved electrical properties once the valve metal is formed into a capacitor anode. Processes for preparing a nitrided valve metal are further described and involve nitriding the valve metal at a sufficient temperature and pressure during a heat treatment that is prior to the deoxidation step. Capacitor anodes and other products incorporating the valve metals of the present invention are further described.

19 Claims, 4 Drawing Sheets

U.S. PATENT DOCUMENTS

| | | | |
|---|---|---|---|
| 5,245,514 A | 9/1993 | Fife et al. | 361/529 |
| 5,314,675 A | 5/1994 | Dubots et al. | 424/344 |
| 5,412,533 A | 5/1995 | Murayama et al. | 361/528 |
| 5,448,447 A | 9/1995 | Chang | 361/528 |
| 5,560,761 A | 10/1996 | Naito | 75/255 |
| 5,605,561 A | 2/1997 | Iwabuchi et al. | 75/364 |
| 5,825,611 A | 10/1998 | Pozdeev | 361/503 |
| 6,051,044 A | 4/2000 | Fife | 75/229 |
| 6,115,235 A | 9/2000 | Naito | 361/303 |
| 6,136,062 A | 10/2000 | Loffelholz et al. | 75/369 |
| 6,171,363 B1 | 1/2001 | Shekhter et al. | 75/369 |
| 6,185,090 B1 | 2/2001 | Pozdeev-Freeman | 361/524 |
| 6,193,779 B1 | 2/2001 | Reichert et al. | 75/343 |
| 6,212,065 B1 | 4/2001 | Pozdeev-Freeman et al. | 367/528 |
| 6,215,652 B1 | 4/2001 | Yoshida et al. | 631/524 |
| 6,423,110 B1 * | 7/2002 | Naito et al. | 75/232 |

OTHER PUBLICATIONS

W.A. Seriak, L. Schechter, T.B. Tripp, L.L. Lanin, K. Reichert, O. Thomas, and J. Vieregge, "*A New Material for Capacitors: Niobium*," pp. 82–85, (Mar. 2000).

International Search Report for PCT/US 01/06449, mailed on Sep. 13, 2001.

* cited by examiner

US 6,679,934 B2

NITRIDED VALVE METALS AND PROCESSES FOR MAKING THE SAME

CROSS REFERENCE TO RELATED APPLICATION

This application claims the benefit under 35 U.S.C. §119 (e) of prior U.S. Provisional Patent Application No. 60/185,979 filed Mar. 1, 2000, which is incorporated in its entirety by reference herein.

BACKGROUND OF THE INVENTION

The present invention relates to valve metals and processes of preparing valve metals of acceptable quality for use in such applications as capacitors and the like.

There is always a desire in the industry to improve on the properties of valve metals, such as tantalum, particularly in the areas of capacitance and DC leakage achieved by valve metals when formed into capacitor anodes. The manner in which the various valve metal properties are improved upon include modifying various steps of the processes involved in making the valve metal, including purifying the valve metal.

There are general processes known to those skilled in the art for preparing valve metals. For instance, tantalum is obtained from ore and subsequently crushed into a powder. The tantalum is then separated from the crushed ore through the use of an acid solution and density separation of the acid solution containing the tantalum from the acid solution containing niobium and other impurities. The acid solution containing the tantalum is then crystallized into a salt and this tantalum containing salt is then reacted with pure sodium in order to reduce the tantalum containing salts to tantalum and to form salts with the non-tantalum containing elements. Water washing is then used to remove the salts and recover the tantalum which is subsequently subjected to one or more acid Teachings to remove chemical impurities. The tantalum is then dried resulting in what is known as a basic lot powder. Typically, this basic lot(s) is subjected to a heat treatment or thermal agglomeration step and then passivated to obtain a powder cake that is subsequently ground up into a powder. A deoxidation step using oxygen getters, such as magnesium, is then performed. After the deoxidation step, the tantalum powder is generally subjected to an acid wash and dried. The powder is then pressed into a pellet and sintered for subsequent processing by capacitor anode manufacturers.

There is an interest by those skilled in the art to nitride valve metals, such as tantalum, with the belief that such nitriding can decrease the DC leakage in capacitor anodes formed from such nitrided tantalum. The current nitriding techniques primarily involve the use of nitrogen containing compounds or nitrogen gas during the deoxidation stage. This method has several disadvantages including the lack of uniform distribution of the nitrogen in the valve metal.

Accordingly, there is a desire to improve on the methods of nitriding valve metals as well as improving on the resulting product.

SUMMARY OF THE PRESENT INVENTION

A feature of the present invention is to provide processes to nitride valve metals, such as tantalum.

Another feature of the present invention is to provide a process which provides a more uniform distribution of the nitrogen throughout the valve metal.

A further feature of the present invention is to provide nitrided valve metals, such as tantalum.

An additional feature of the present invention is to provide a nitrided valve metal, such as tantalum, having high capacitance capability along with excellent flow properties and/or Scott density.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages, and in accordance with the purpose of the present invention, as embodied and broadly described herein, the present invention relates to a process of preparing a nitrided valve metal which involves the step of nitriding a valve metal powder at a sufficient temperature and pressure prior to a deoxidation step. Preferably, the nitriding of the valve metal occurs during a heat treatment step but always prior to the deoxidation step.

The present invention further relates to nitrided valve metals wherein the nitrogen content is from about 1,500 ppm to about 4,000 ppm and is substantially and uniformly distributed throughout the valve metal. All ppm referenced herein are by weight.

The present invention also relates to a nitrided valve metal, such as tantalum, wherein at least a portion of the valve metal has pore sizes equal to or greater than 2 microns in size.

The present invention in addition relates to a nitrided tantalum having a capacitance of from about 40,000 CV/g to about 80,000 CV/g when formed into a capacitor anode and having a Scott Density of from about 25 to about 40 g/in$^3$ and/or a flow of from about 70 to about 300 mg/s.

It is to be understood that both the foregoing general description and the following detailed description are exemplary and explanatory only and are intended to provide a further explanation of the present invention, as claimed.

The accompanying drawings, which are incorporated in and constitute a part of this application, illustrate several embodiments of the present invention and together with the description serve to explain the principles of the present invention.

DETAILED DESCRIPTION OF THE PRESENT INVENTION

Figure 1:
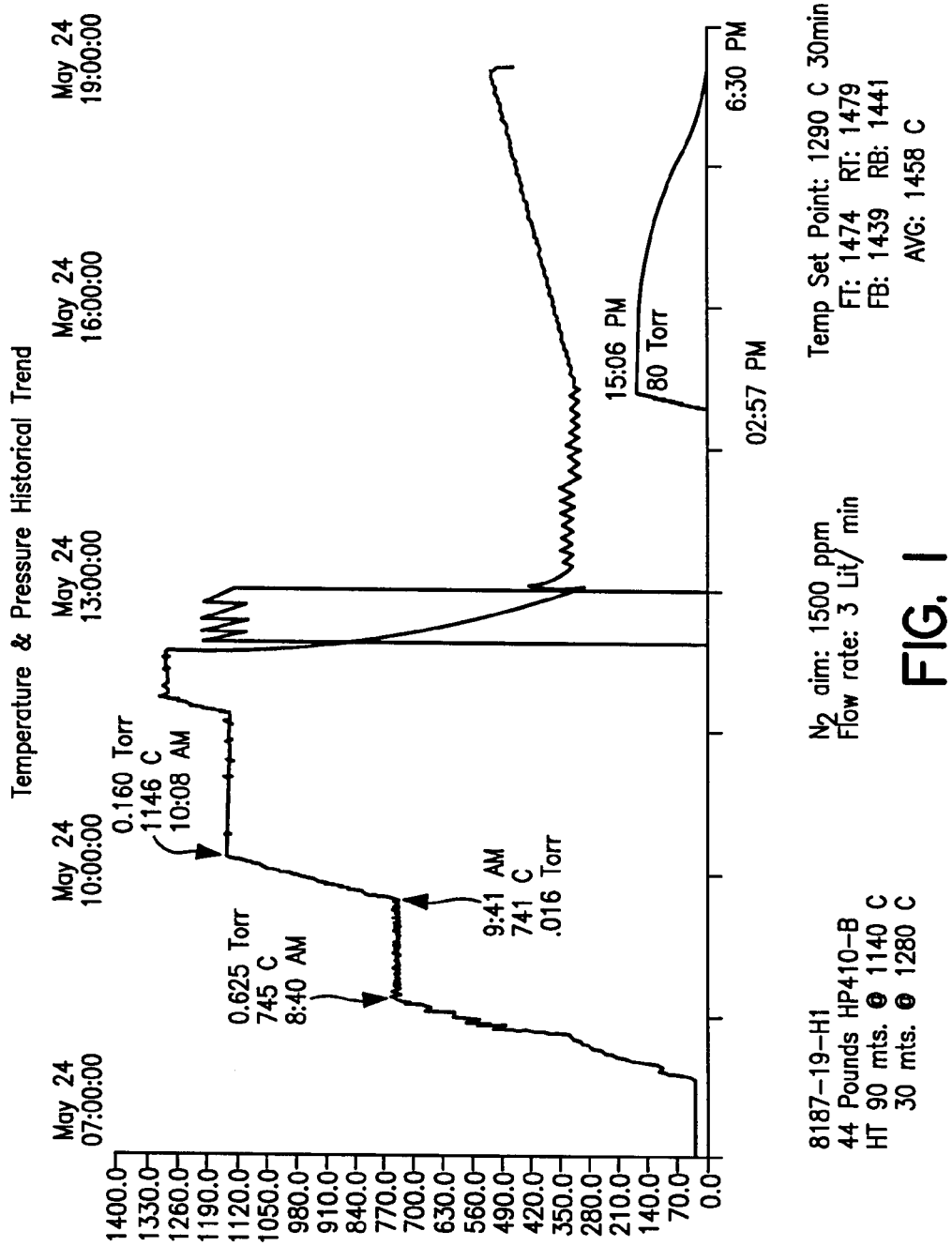
FIGS. 1 and 2 are graphs depicting the temperature and pressure conditions during a heat treatment, wherein tantalum powder was nitrided.

The present invention relates to nitrided valve metals and processes for making nitrided valve metals.

For purposes of the present invention, valve metals include, but are not limited to, tantalum and niobium. Preferably, the valve metal is tantalum or niobium, and more preferably is tantalum.

The valve metal that is nitrided can be in any form and is preferably in the form of a powder. The powder can be any shape, such as flaked, nodular, or combinations thereof, and the like. Further, the powder can have any surface area and particle size and/or agglomerate size. For instance, the powder can have a BET surface area of from about 0.5 to about 10 $m^2/g$ and more preferably from about 1 to about 3 $m^2/g$.

Furthermore, when the powder, such as tantalum, is formed into a capacitor anode, the capacitor preferably has a capacitance of from about 20,000 to about 80,000 CV/g, and more preferably from about 26,000 to about 64,000 CV/g when formed at 30 volts and a press density of 5.5 g/cc.

Preferably, the valve metal powder, especially tantalum, has a flow of from about 70 to about 300, and more preferably from about 80 to about 200 mg/s, as determined by the flow test recited in WO 99/61184, incorporated in its entirety by reference herein. Also, or alternatively, preferably the valve metal powder, especially tantalum, has a Scott Density of from about 25 to about 40, and more preferably, from about 26 to about 32 $g/in^3$.

The amount of nitrogen present in the valve metal powder can be any amount suitable for such applications as capacitor anodes. Preferably, the nitrogen content is from about 1,500 ppm to about 4,000 ppm. The inventor has found that amounts generally greater than about 4,000 ppm do not lead to any additional improvement in properties compared to lower amounts of nitrogen. Similarly, amounts lower than about 1,500 ppm nitrogen generally do not accomplish the desired improvements sought with nitrogen doping. Accordingly, the range of from about 1,500 ppm to about 4,000 ppm is beneficial, and more preferably the range of from about 2,000 ppm to about 3,000 ppm nitrogen.

The valve metal can also have a phosphorus content, such as from about 50 ppm to about 100 ppm. The valve metal can also have an oxygen content, such as from about 1,500 ppm to about 3,500 ppm.

In addition, the valve metal powder, preferably tantalum, has at least a portion of the pores with a pore size of 2 microns or greater leads to beneficial properties once a capacitor anode is made and impregnated, since such pore sizes permit the more uniform and complete impregnation with the counter electrode liquid.

As stated earlier, the process of nitriding the valve metal preferably begins with the basic lot powder of the valve metal. The following discussion uses tantalum as an example but it must be realized that the following discussion is applicable to any valve metal and the process conditions, such as temperature and time of heat treatment, varies depending upon the type of valve metal involved.

In the present process, the basic lot powder can be obtained by any processing techniques known to those skilled in the art. Such general processing techniques have been discussed above in the background of the invention and typically involve recovering the ore, crushing the ore, conducting solvent extraction to recover the tantalum in a salt form, and reducing the tantalum salt with sodium in order to form tantalum and other salts. These other salts are generally removed by water washing, and acid leaching can then be conducted to remove chemical impurities. The tantalum is then dried to obtain the basic lot. These above steps can be modified in any manner or alternative steps can be used in order to achieve what is known to those skilled in the art as a basic lot powder.

Once the basic lot is obtained, it is preferred (though, optional) for purposes of the present invention to conduct further processing of the tantalum powder or other valve metal prior to heat treatment. One preferred processing step before heat treatment is conducting water agglomeration as described in PCT Publication No. WO 99/61184 published Dec. 2, 1999, incorporated in its entirety herein by reference. The tantalum powder in the form of a powder or powder cake, with or without the prior water agglomeration or other agglomeration procedures, can then be subjected to a heat treatment wherein the nitriding of the tantalum powder occurs.

For purposes of the present invention it is understood that heat treatment and thermal agglomeration refer to the same processing step which involves subjecting the tantalum powder or other valve metal powder to elevated temperatures generally in a furnace and generally under vacuum.

Preferably, in the heat treatment step and with reference to tantalum powder, if significant levels of hydrogen are present in the tantalum powder, such as on the order of greater than about 200 or 300 ppm hydrogen, then a degassing step is preferably conducted in order to substantially remove the hydrogen present. Typically, the degassing step will remove enough hydrogen from the tantalum powder so that after the degassing step, the amount of hydrogen present in the tantalum powder is below 50 ppm hydrogen and preferably below 40 ppm hydrogen gas.

Once the tantalum powder has been degassed (if needed), the heat treatment or thermal agglomeration of the tantalum powder can occur. With respect to tantalum, typically the sintering phase of the heat treatment occurs at a temperature of from about 1100° C. to about 1500° C., which is the approximate average temperature reached on the surface of the powder in the furnace. Generally, the heat treatment at this temperature range occurs for about 10 minutes to about 2 hours, although other times can be used depending upon the desired properties. For purposes of the present invention, the heat treatment includes the time necessary to reach the sintering phase which generally causes some loss of surface area of the powder. Furthermore, the heat treatment typically occurs under vacuum and preferably at about 0.01 Torr or less. The nitriding of the tantalum powder occurs during heat treatment and prior to the deoxidation step.

The nitriding of the tantalum powder or other valve metal preferably occurs at a temperature of about 600° C. or lower, and more preferably from about 250° C. to about 600° C., and more preferably from about 300° C. to about 400° C. Since the nitriding is preferably occurring at temperatures not above 600° C., it is preferred to conduct the nitriding where these temperatures are achievable, meaning, nitriding right before the sintering phase of heat treatment occurring at 1250° C.–1500° C. or after this high temperature phase has occurred. In the present invention, the nitriding of the metal powder preferably occurs once the temperature of the metal powder has reached some stability and is not fluctuating significantly (e.g., not fluctuating by more than 50° C. or so). Further, preferably the nitriding begins at a temperature of about 200°–300° C. to avoid the absorption of nitrogen in one location of the powder. Preferably, nitriding is started at a low temperature, like 200° C.–300° C., and then the temperature is ramped up at approximately 1° C. to about 10° C. per minute. Thus, a steady increase in temperature ensures that nitrogen absorption is uniform throughout the powder and further ensures that the temperature is substantially uniform for absorption, which can vary depending on powder and surface area, is reached for a sufficient time to permit absorption.

The nitriding of the tantalum powder can be accomplished with the use of a nitriding agent, such as nitrogen gas or a nitrogen containing gas or with nitrogen containing or generating compounds (e.g., TaN). Preferably, a nitrogen gas is used in this process. Generally, once the tantalum powder is at the preferred temperature range of from about 250° C. to about 600° C., the nitriding process is preferably started. In the preferred embodiment, the nitrogen gas is introduced into the furnace under vacuum and the amount of nitrogen gas introduced is dependent upon the amount of nitrogen desired in the resulting nitrided powder and the amount of basic lot powder present in the furnace. In the Examples, it can be seen that various amounts of nitrogen were introduced in order to achieve various nitrogen contents in the powder. In view of the present invention, one skilled in the art can readily determine the amount of nitrogen to be introduced into the furnace for a desired amount of nitrogen in the final metal powder.

It is preferred that the nitrogen gas or other nitrogen generating techniques do not occur at temperatures above 600° C. because the combination of nitrogen with tantalum is an exothermic reaction which generates heat and leads to an autocatalytic process which can be uncontrollable. This reaction leads to a non-uniformed distribution of the nitrogen in the basic lot powder.

Generally, during the nitriding process, the nitrogen is introduced into the furnace and is readily absorbed by the basic lot powder present in the furnace. Once the nitrogen gas has been absorbed, or prior to this step, the basic lot powder is subjected to the higher heat treatment phase or sintering phase of heat treatment described earlier. Once the desired heat treatment at high temperatures and the desired nitriding of the basic lot powder has occurred, the temperature is preferably substantially reduced in order to passivate the powder. Generally, the powder is in the form of a powder cake which is subsequently subjected to grinding. The powder can then be subjected to a deoxidation process. Any conventional deoxidation process can be used, such as with magnesium or any other oxygen getters. Once the deoxidation step and subsequent acid leaching is complete, the powder can be further processed in conventional manners, such as by pressing into pellets and sintering at desired temperatures which is dependent upon the desired capacitance and the type of valve metal being sintered. The sintered pellets can then be used as capacitor anodes using standard techniques known in the industry such as those set forth in U.S. Pat. Nos. 4,805,074; 5,412,533; 5,211,741; and 5,245,514, and European Patent Application Nos. 0 634 762 A1, incorporated in their entirety herein by reference.

The nitriding of the valve metal during the heat treatment step is beneficial compared to other nitriding methods which typically occur during the deoxidation step. By nitriding during the heat treatment stage, a more uniform distribution of the nitrogen throughout the entire valve metal powder is achieved. One reason this occurs may be due to the fact that the nitriding occurs at an early stage of the metal processing and thereafter there are many other stages which involve subjecting the valve metal to high temperatures. These additional stages assist in uniformly distributing the nitrogen. Thus, the earlier the nitriding can occur, the more uniform distribution of the nitrogen throughout the valve metal can be achieved. In the examples, as can be seen, uniform nitrogen distribution was accomplished.

It is certainly possible and within the bounds of the present invention to conduct more than one nitriding step in order to achieve any amount of nitrogen content desired in the final product.

The present invention will be further clarified by the following examples, which are intended to be exemplary of the present invention.

EXAMPLES

Example 1

44 pounds of tantalum basic lot powder having the characteristics set forth in Table 1 were used. The basic lot tantalum powder was introduced into a furnace and placed under vacuum. A hydrogen degassing procedure was conducted by raising the temperature of the basic lot powder to about 745° C. for one hour, and during this time the increase in pressure resulting from the hydrogen release was vented out using a vacuum. Thereafter, under vacuum, the basic lot powder temperature was further increased to about 1146° C. for about 60 minutes and then the temperature of the basic lot powder was raised to about 1458° C. for 30 minutes and then the temperature was reduced to about 350° C. Argon gas was introduced once the furnace cooled to about 1,000° C. to aid in the cooling process. Once this lower temperature was reached, the argon gas was removed and nitrogen gas was introduced into the vacuum by pumping out and replacing the argon with nitrogen gas at a pressure of about 80 Torr. During this nitrogen addition, the temperature of the basic lot powder was increased to about 500° C. at a rate increase of 1° C. per minute and the pressure of the nitrogen gas decreased to about 1 Torr or less because the tantalum was absorbing the nitrogen. Once the nitrogen was absorbed, the furnace was then backed filled with argon and the powder was permitted to cool. FIG. 1 plots this procedure.

Upon measurement, the basic lot powder had a nitrogen content of about 1,500 ppm. FIG. 1 reflects the temperature and pressure changes as well as the point of nitrogen introduction during the heat treatment.

Example 2

Figure 2:
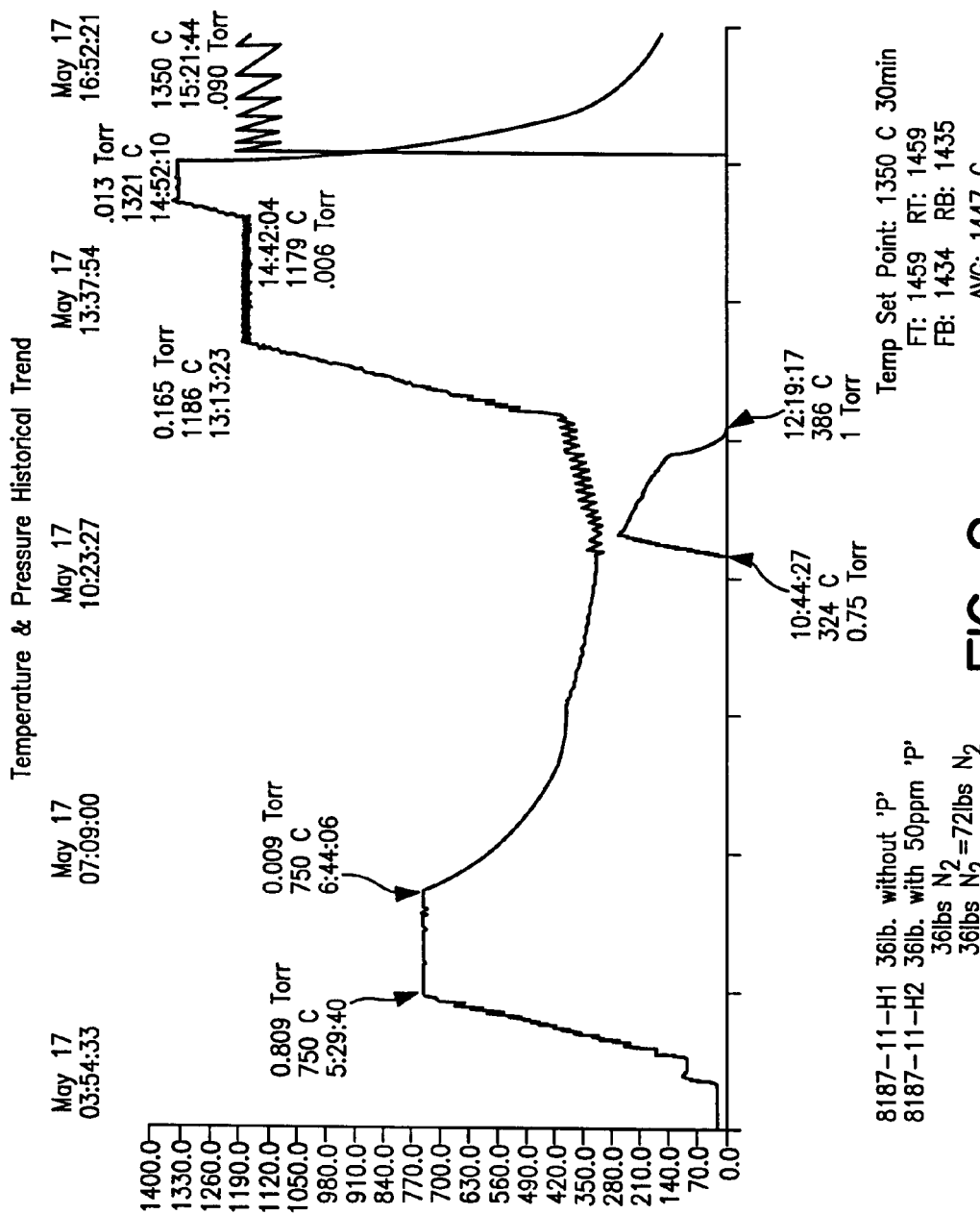

A basic lot tantalum powder (72 lbs.-36 lbs. of this tantalum was doped with 50 ppm P) similar to that used in Example 1 was subjected to a heat treatment like in Example 1, wherein the basic lot powder was subjected to a hydrogen degassing procedure by raising the temperature of the basic lot powder to about 750° C. for about 1 hour and 15 minutes. During this time, the release of hydrogen gas was vented under vacuum. Once the vacuum level reaches 10 microns or lower, the temperature of the basic lot powder was then allowed to cool down to about 350° C. wherein about 80 Torr of nitrogen gas was introduced into the furnace. Like in Example 1, the nitrogen gas was essentially fully absorbed by the tantalum powder and there was a temperature increase during this time of about 60° C. Once the nitriding was finished, the furnace chamber was evacuated to 10 microns or less and then the temperature of the basic lot powder was then raised to about 1186° C. for about an hour and a half and then raised even higher to about 1350° C. for 30 minutes (sintering phase of heat treatment) and thereafter the temperature of the basic lot tantalum powder was allowed to cool off for further processing. FIG. 2 plots this procedure.

Example 3

The powders from Examples 1 and 2 were then processed as follows:

Heat treated material which was in the form of cakes was crushed and screened using 70 mesh (US Sieve) screen. The −70 mesh powder was blended with magnesium. Magnesium content was 0.75% by weight. Magnesium blended tantalum powder was deoxidized by reacting at 850C. This deoxidation step was conducted to lower the oxygen content of the tantalum powder to reasonable level. The deoxidized tantalum powder was then treated with nitric acid, hydrofluoric acid and deionized water to remove the residual magnesium and the magnesium oxide generated during the deoxidation process. Acid treated powder was further rinsed with deionized water until a conductivity of less than 10 micromhos/cm was attained in the DI water. The rinsed tantalum powder was dried using a vacuum dryer. A representative sample of the dried powder was taken and analyzed for physical, chemical, and electrical properties of the powder. The results are shown in the Tables 1, 2, and 3. The electrical properties were evaluated using the following procedure:

[1] Anode Fabrication:
   (a) N=16 anodes per sample
   (b) Diam=0.1235"
      Length=0.1021"
      Powder Wt=100 mg
      Dp=5.0 g/cc

[2] Anode Sintering (NRC Furnace):
   (a) 1 Sinters
      1430° C.*30' (10° C. per minute ramp)

[3] 100V Ef Evaluation:
   (a) Anodization:
      (1) One Formation
         N=8 anodes (one tree) per sample
         (1) tree/sample+standards
      (2) Electrolyte; (0.1% H3PO4@90° 3.08 mmho)
      (3) Constant current density: (75 ma/g)
      (4) Terminal Voltage=100.0 VDC+/−0.03
      (5) Terminal Voltage Time=180 min−0/+5 min
      (6) 25° C. soak for 30 min
      (7) 100° C. oven for 30 min
   (b) DC Leakage:
      (1) Charge E=70.0+/−0.02
      (2) Charge Time=30 sec & 120 sec
      (3) DCL Test Electrolyte=10% H3PO4@21° C.
   (c) Capacitance/DF:
      (1) Capacitance Test Electrolyte=18% H2SO4@21° C.
      (2) Bias=2.5 VDC
      (3) Frequency=120 Hz
      (4) Series Capacitance
      (5) GenRad # 1658

Example 4

A sample was prepared using basic lot tantalum powder described in Table 9. Sample was prepared by soaking 60 pounds of tantalum with 34% of deionized water containing phosphorous dopant solution to provide 100 ppm by weight of phosphorous. The powder was soaked for 16 hours. Soaked powder was transferred to Teflon coated stainless steel trays and additional 3% of deionized water was added. The wet powder was vibrated for eight to ten minutes using the vibrating table. After vibrating, the trays were allowed to sit for at least sixty minutes for any water to separate. Any water which separated was decanted. Afterwards the drying trays were transferred to a vacuum dryer. The commercial vacuum dryer was purchased from STOKES VACUUM Inc. The model number is 338J. The material in the stainless steel trays was dried for approximately 14 hours at about 195° F. and 50 torr pressure. The dried tantalum powder was then transferred to a tantalum tray for heat treatment. The heat treatment was conducted at approximately 1309° C. for about 30 minutes. The cakes were then transferred to a batch can for milling and were milled and screened using 70 mesh (US Sieve) screen. −70 mesh portion of the material was deoxidized using 2% magnesium at 850° C. and acid leached using nitric acid, hydrogen peroxide and deionized water. Powder was further rinsed with DI water until the conductivity is lowered to less than 5 micromhos/cm. Rinsed powder was dried in a vacuum dryer. Samples were deoxidized again, to lower the oxygen, using 2% magnesium at 850° C. and acid leached, rinsed and dried as described above. The final product was analyzed and the data is shown in Table 4 and 9.

Electrical evaluation was conducted using the following procedure.

[1] Anode Fabrication:
   (a) Haberer Press—
      (1) N=16 anodes per sample
      (2) non-lubed powder
      (3) size—0.1545" dia×0.1225" length
      (4) Dp=5.0 g/cc
      (5) powder wt=188 mg

[2] Anode Sintering:
   (a) NRC Furnace;
      1335° C.*10 ("A" ramp)

[3] 30V Ef Evaluation:
   (a) Anodization:
      (1) N=8 anodes (one tree) per sample
      (2) Electrolyte;
         E251 Test Electrolyte (0.06% H3PO4@83°, 2.86 mmho)
      (3) Constant current density: E251 Test current (337.5 ma/g)
      (4) Terminal Voltage=30.0 VDC+/−0.03
      (5) Terminal Voltage Time=300 min−0/+5 min
      (6) Soak 25° for 30 minutes
      (7) 100° C. oven for 30 minutes
   (b) DC Leakage:
      (1) Charge E=21.0+/−0.02
      (2) Charge Time=30 & 120 sec
      (3) DCL Test Electrolyte=10% H3PO4@21° C.
   (c) Capacitance/DF:
      (1) Capacitance Test Electrolyte=18% H2SO4@21° C.
      (2) Bias=2.5 VDC
      (3) Frequency=120 Hz
      (4) Series Capacitance
      (5) GenRad# 1658

Final properties of the tantalum powders are set forth in Tables 4, 5, and 9.

Example 5

Figure 3:
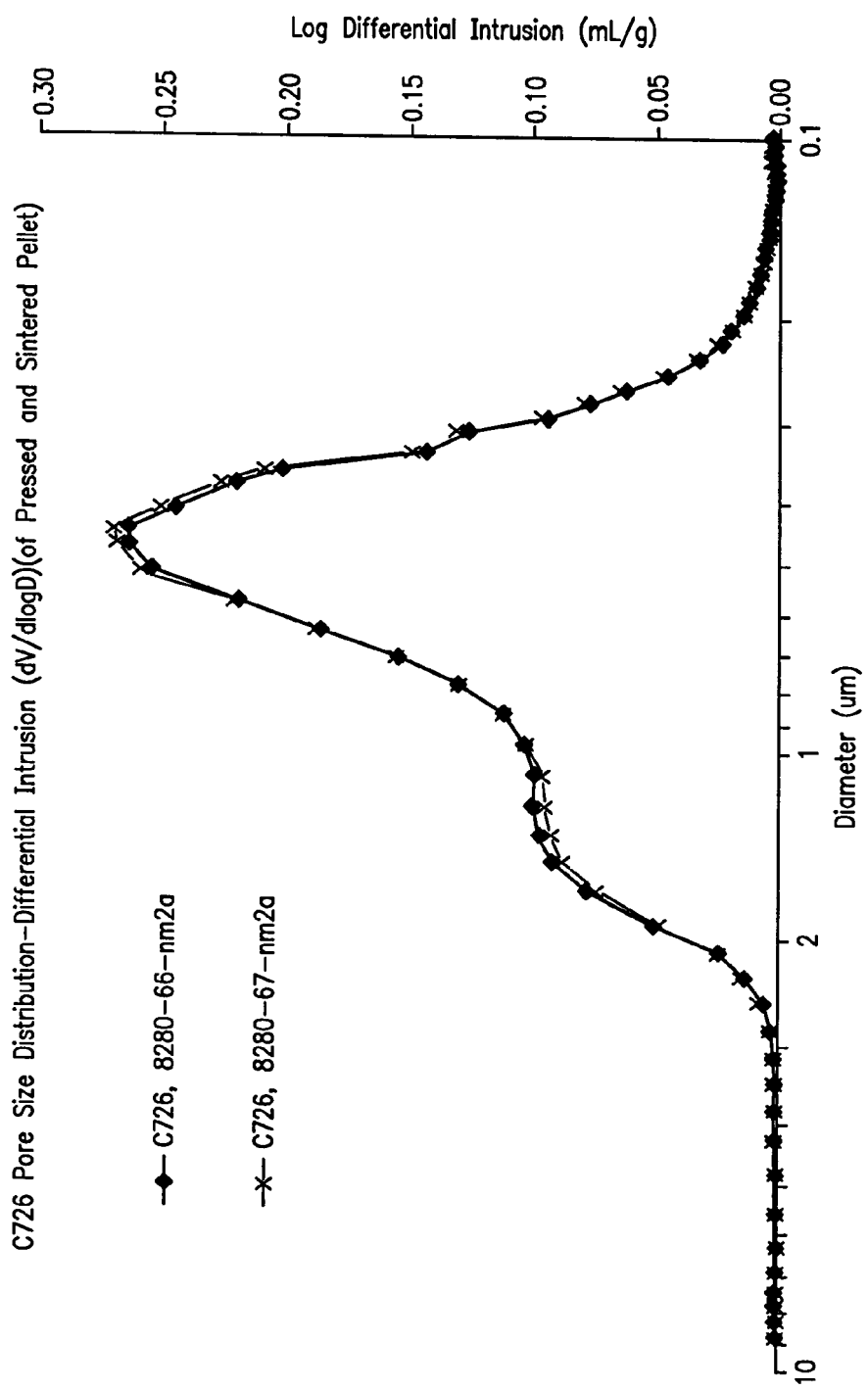
FIGS. 3 and 4 are graphs depicting pore size diameter of nitrided tantalum vs. Log Differential Intrusion (mL/g) and pore size diameter vs. Cumulative Pore Volume (mL/g).
Figure 4:
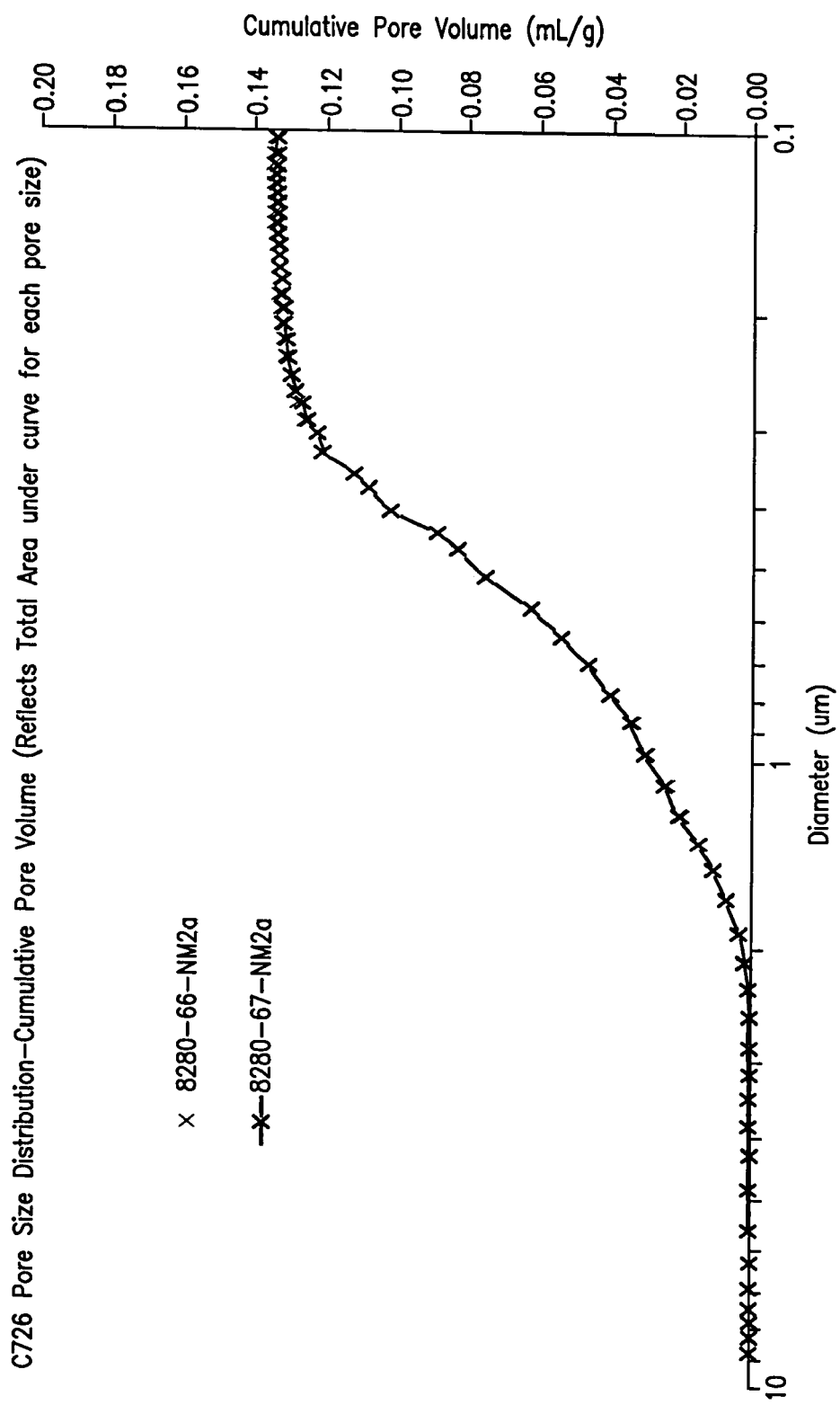

In this example, about 45 lbs. of basic lot tantalum powder per lot were nitrided as in Example 4 except the final temperature of the powder was about 1300° C. for about 30 minutes. The characteristics of the resulting nitrided tantalum are set forth in Tables 4 and 5. FIG. 3 reflects the pore size distribution of a pressed and sintered tantalum pellet and FIG. 4 reflects the cumulative pore volume for each pore size.

Example 6

72 pounds of basic lot tantalum powder were doped with nitrogen for a target nitrogen content of 1500 ppm. In this process, the powder was heated to 740° C. followed by hydrogen degassing and then the powder was cooled down to about 325° C. At this point, nitrogen gas was introduced in the same manner as in Example 1. Following nitrogen doping, the samples were removed to determine whether the nitrogen doping distribution was uniform for all of the trays containing tantalum powder in the furnace. The particulars of doping with nitrogen and other parameters are set forth in Table 6. Table 7 (run number 5) also sets forth another experiment involving nitrogen doping for a variety of samples in the furnace with the target value of 2,500 ppm nitrogen in the final product.

As a comparison, tantalum powder was nitrided during the deoxidation stage. The nitrogen doping amount was higher but this was done in order to ensure nitrogen was absorbed in all tray samples. Details are set forth on Table 8.

As can be seen from Tables 6 and 7, the amount of nitrogen content on average was very close to the target value in each instance and the overall difference between the various trays was within acceptable parameters. When nitriding occurred during the deoxidation stage, the non-uniform nitrogen distribution from tray to tray was observed as can be seen in Table 8. In more detail, there was large differences in absorbed nitrogen amounts from tray to tray. Where nitriding during heat treatment caused a variation of about 1,000–1,500 ppm, nitriding during deoxidation caused a variation over 20,000 ppm.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

TABLE 1

Used HP410 basic lot blend. 36 lbs. From HP410-B-121828 and 36 lbs. From HP410-B-121829. 36 pounds was processed without "P" and the other 36 pounds was doped with 50 ppm "P" using NH4PF6. Powder was heated to 740° C. followed by degas, cool down to 325° C. and nitrogen was introduced. 1500 ppm AIM. This is heat treated for 90 min @ 1180° C. followed by 30 min @ 1350° C. (SPC: 1447 C.)

|  | 8187-11-B Basic Lot | 8187-11-NM2 Finished product |
|---|---|---|
| HT set point |  | 30 min @ 1350 C. |
| FSS (microns) | 0.89 | 2.54 |
| Scott (gms/inch3) | 18.7 | 31.0 |
| BET (m2/gm) | 1.00 | 0.59 |
| Na (ppm) | 6 | 2 |
| K (ppm) | 11 | 4 |
| P (ppm) | 48 | 4 |
| C (ppm) | 12 | 24 |
| O (ppm) | 2822 | 1670 |
| N (ppm) | 29 | 2326 |
| H (ppm) | 557 | 36 |
| Si (ppm) | 240 | 19 |
| Fe (ppm) | 4 | 4 |
| Ni (ppm) | 5 | 10 |
| Cr (ppm) | 4 | 4 |
| Nb (ppm) | 24 | 24 |
| Ti (ppm) | 4 | 4 |
| Mn (ppm) | 4 | 4 |
| Sn (ppm) | 4 | 4 |
| Ca (ppm) | 4 | 4 |
| Al (ppm) | 4 | 4 |
| Mo (ppm) | 4 | 4 |
| W (ppm) | 24 | 24 |
| Zr (ppm) | 4 | 4 |
| Mg (ppm) | 4 | 4 |
| B (ppm) | 3 | 3 |
| Co (ppm) | 4 | 4 |
| Cu (ppm) | 4 | 4 |
| Screens |  |  |
| +60 |  | 2.4 |
| 60/100 |  | 14.7 |

TABLE 1-continued

Used HP410 basic lot blend. 36 lbs. From HP410-B-121828 and 36 lbs. From HP410-B-121829. 36 pounds was processed without "P" and the other 36 pounds was doped with 50 ppm "P" using NH4PF6. Powder was heated to 740° C. followed by degas, cool down to 325° C. and nitrogen was introduced. 1500 ppm AIM. This is heat treated for 90 min @ 1180° C. followed by 30 min @ 1350° C. (SPC: 1447 C.)

|  | 8187-11-B Basic Lot | 8187-11-NM2 Finished product |
|---|---|---|
| 100/200 |  | 26.4 |
| 200/325 |  | 15.2 |
| 325/400 |  | 9.0 |
| −400 |  | 32.3 |
| FLOW (mg/sec) |  | 163 |
| Crush Str. |  | 26.0 lbs |
| 1480 C. 50 V Cap |  | 25970 |
| DCL (nA/CV) |  | 0.07 |
| Fliers |  | 0/8 |
| Shrinkage |  | 3.3 |
| Sinter Density |  | 5.4 |

Press Density 5.0 g/cc

TABLE 2

(Example 1)
Used HP 410 basic lot blend. 36 lbs. From HP410-B-121828 and 36 lbs. from HP410-B-121829. 36 pounds was processed without "P" and the other 36 pounds was doped with 50 ppm "P" using NH4PF6. Powder was heated to 740° C. followed by degas, cool down to 325° C. and nitrogen was introduced. 1500 ppm AIM. This is heat treated for 90 min @ 1180° C. followed by 30 min at 1350° C. (SPC: 1447 C.).

|  | 8187-11-B Basic Lot | 8187-11-NM2 Finished product |
|---|---|---|
| HT (SPC) |  | 1447 C. |
| FSS (microns) | 0.89 | 2.54 |
| Scott (gms/inch3) | 18.7 | 31.0 |
| BET (m2/gm) | 1.00 | 0.59 |
| C (ppm) | 12 | 24 |
| O (ppm) | 2822 | 1670 |
| N (ppm) | 29 | 2326 |
| H (ppm) | 557 | 36 |
| Screens |  |  |
| +60 |  | 2.4 |
| 60/100 |  | 14.7 |
| 100/200 |  | 26.4 |
| 200/325 |  | 15.2 |
| 325/400 |  | 9.0 |
| −400 |  | 32.3 |
| FLOW (mg/sec) |  | 163 |
| 1430 C. 100 V C |  |  |
| Cap (CV/gm) |  | 23,829 |
| DCL (nA/CV) |  | 0.33 |
| Shrinkage |  | 0.1 |
| Sinter Density |  | 5.1 |

TABLE 3

(Example 2)

|  | 8187-11-B Basic Lot | 8187-19-NM Finished product |
|---|---|---|
| HT (SPC) |  | 1458 C. |
| FSS (microns) (mod) | 0.89 | 2.35 |
| Scott (gms/inch3) | 18.7 | 29.4 |
| BET (m2/gm) |  | 0.37 |

TABLE 3-continued (Example 2)

|  | 8187-11-B<br>Basic Lot | 8187-19-NM<br>Finished product |
|---|---|---|
| C (ppm) | 12 | 23 |
| O (ppm) | 2822 | 1959 |
| N (ppm) | 29 | 1333 |
| H (ppm) | 557 | 50 |
| Screens |  |  |
| +60 |  | 0.0 |
| 60/100 |  | 7.3 |
| 100/200 |  | 28.2 |
| 200/325 |  | 18.7 |
| 325/400 |  | 10.2 |
| −400 |  | 35.5 |
| 1430 C. 100 V Cap |  |  |
| Capacitance (CV/gm) |  | 24,885 |
| DCL (nA/CV) |  | 0.24 |
| Shrinkage |  | −0.6 |
| Sinter Density |  | 4.8 |

TABLE 4

Physical, Chemistry Properties of Nitrided Powder

|  | 8280-66-nm2a | 8280-67-nm2a | 8280-68-nm2a | Average |
|---|---|---|---|---|
| Modified FSS (microns) | 2.91 | 2.39 | 2.32 | 2.54 |
| Scott (gms/in3) | 28 | 27.8 | 27.9 | 27.9 |
| BET | 1.11 | 1.03 | 1.15 | 1.10 |
| C (ppm) | 60 | 56 | 57 | 58 |
| O (ppm) | 3288 | 3058 | 2978 | 3180 |
| N (ppm) | 2509 | 2379 | 2483 | 2457 |
| H (ppm) | 71 | 81 | 87 | 79.7 |
| Si (ppm) | 5 | 5 | 4 | 4.7 |
| Ni (ppm) | 17 | 4 | 4 | 8.3 |
| Fe (ppm) | 4 | 4 | 4 | 4.0 |
| Cr (ppm) | 4 | 4 | 4 | 4.0 |
| Cb (ppm) | 24 | 24 | 24 | 24.0 |
| Ti (ppm) | 4 | 4 | 4 | 4.0 |
| Mn (ppm) | 4 | 4 | 4 | 4.0 |
| Sn (ppm) | 4 | 4 | 4 | 4.0 |
| Ca (ppm) | 4 | 4 | 4 | 4.0 |
| Al (ppm) | 4 | 4 | 4 | 4.0 |
| Mo (ppm) | 4 | 4 | 4 | 4.0 |
| W (ppm) | 24 | 24 | 24 | 24.0 |
| Zr (ppm) | 4 | 4 | 4 | 4.0 |
| Mg (ppm) | 5 | 5 | 10 | 6.7 |
| B (ppm) | 1 | 1 | 1 | 1.0 |
| Co (ppm) | 4 | 4 | 4 | 4.0 |
| Cu (ppm) | 4 | 4 | 4 | 4.0 |
| Na (ppm) | 6 | 4 | 5 | 5.0 |
| K (ppm) | 29 | 26 | 28 | 27.7 |
| Screens |  |  |  |  |
| +60 | 0 | 0 | 0 | 0.0 |
| −60/+100 | 23.4 | 23.7 | 30.5 | 25.87 |
| −100/+200 | 33.1 | 35.2 | 33.2 | 33.83 |
| −200/+325 | 15.6 | 14.6 | 12.6 | 14.27 |
| −325/+400 | 8.2 | 7.8 | 6.8 | 7.60 |
| −400 | 19.7 | 18.7 | 16.9 | 18.43 |
| Flow (mg/sec) | 97.4 | 103.4 | 103.3 | 101.4 |
| mtrack |  |  |  |  |
| per 10 | 27.72 | 29.83 | 22.33 | 26.63 |
| per 50 | 118.31 | 119.08 | 109.43 | 115.61 |
| per 90 | 261.04 | 260.8 | 265.11 | 262.32 |
| SA | 0.102 | 0.094 | 0.127 | 0.11 |

TABLE 5

Electrical Properties of Nitrided Powder

|  | 8280-66-NM2A | 8280-67-NM2A | 8280-68-NM2A | Average |
|---|---|---|---|---|
| Sintering Temp. 1335 C. 30 V | 36.3 | 35.9 | 41.0 | 37.7 |
| Cap (cv/gm) | 67,726 | 68,686 | 68,898 | 68,437 |
| DCL (na/cv) | 0.31 | 0.27 | 0.36 | 0.32 |
| Fliers | 0 | 1 | 0 | 0.33 |
| Sint. Den. | 5.20 | 5.17 | 5.18 | 5.18 |
| Shrinkage | 1.68 | 1.81 | 1.61 | 1.70 |
| Sintering Temp. 1265° C. 30 V |  |  |  |  |
| Cap (cv/gm) | 70,266 | 71,198 | 71,769 | 71,077 |
| DCL (na/cv) | 0.30 | 0.35 | 0.26 | 0.30 |
| Fliers | 0 | 0 | 0 | 0.00 |
| Sint. Den. | 4.94 | 4.92 | 4.95 | 4.94 |
| Shrinkage | 0.05 | 0.11 | 0.16 | 0.11 |
| Sintering Temp. 1335° C 60 V |  |  |  |  |
| Cap (cv/gm) | 53,802 | 54,719 | 54,495 | 54,338 |
| DCL (na/cv) | 0.53 | 0.38 | 0.42 | 0.44 |
| Fliers | 0 | 0 | 0 | 0.00 |
| Sint. Den. | 5.19 | 5.17 | 5.18 | 5.18 |
| Shrinkage | 1.68 | 1.81 | 1.61 | 1.70 |
| Sintering Temp. 1265° C. 60 V |  |  |  |  |
| Cap (cv/gm) | 55,541 | 56,460 | 56,370 | 56,124 |
| DCL (na/cv) | 0.63 | 0.44 | 0.43 | 0.50 |
| Fliers | 0 | 1 | 0 | 0.33 |
| Sint. Den. | 4.94 | 4.92 | 4.95 | 4.94 |
| Shrinkage | 0.05 | 0.11 | 0.16 | 0.11 |

Press Density in eachcase was 5.0 g/cc.

TABLE 6

72 pounds of HP410 basic lot (C410-S-128793) was doped with nitrogen to an aim value of 1500 ppm. Powder was heated to 740° C. followed by degas, cool down to 325° C. and nitrogen was introduced.

| Tray # | Position | Oxygen | Nitrogen |
|---|---|---|---|
| 8187-10-1T | Tray 1 | Top | 3848 | 598 |
| 8187-10-1M | Tray 1 | Middle | 4467 | 2172 |
| 8187-10-1B | Tray 1 | Bottom | 4498 | 1749 |
| 8187-10-2T | Tray 2 | Top | 3924 | 1056 |
| 8187-10-2M | Tray 2 | Middle | 4055 | 1539 |
| 8187-10-2B | Tray 2 | Bottom | 4567 | 1570 |
| 8187-10-3T | Tray 3 | Top | 3598 | 938 |
| 8187-10-3M | Tray 3 | Middle | 4386 | 1586 |
| 8187-10-3B | Tray 3 | Bottom | 4605 | 1328 |
| 8187-10-4T | Tray 4 | Top | 3700 | 719 |
| 8187-10-4M | Tray 4 | Middle | 4041 | 696 |
| 8187-10-4B | Tray 4 | Bottom | 4269 | 673 |
| 8187-10-5T | Tray 5 | Top | 3794 | 813 |
| 8187-10-5M | Tray 5 | Middle | 4207 | 1689 |
| 8187-10-5B | Tray 5 | Bottom | 4402 | 2297 |
| 8187-10-6T | Tray 6 | Top | 3662 | 1300 |
| 8187-10-6M | Tray 6 | Middle | 4399 | 2382 |
| 8187-10-6B | Tray 6 | Bottom | 4424 | 1612 |
| 8187-10-7T | Tray 7 | Top | 3671 | 1279 |
| 8187-10-7M | Tray 7 | Middle | 4321 | 2084 |
| 8187-10-7B | Tray 7 | Bottom | 4419 | 1702 |
| 8187-10-8T | Tray 8 | Top | 3926 | 1074 |
| 8187-10-8M | Tray 8 | Middle | 4228 | 679 |
| 8187-10-8B | Tray 8 | Bottom | 4692 | 554 |
| 8187-10-NBZ |  | Blend | 4165 | 1420 |
|  |  | Avg. | 4171 | 1329 |

TABLE 6-continued

Ta Powder weight: 72 pounds
Nitrogen aim Value: 1500 ppm
Nitrogen Flow rate: 3 liters/min
Nitrogen addition Time: 16 minutes
Total pressure: 134 torr
Nitrogen Doping Temp.: 325 C. Ramp up @ 1 C./min.
Total Nitrogen absorption time: 240 minutes
Final Temperature achieved: 498° C.

Nitrogen Analysis for 8187-10-H run

|  |  | Front | Rear |
|---|---|---|---|
| Tray #1 | Top | 598 | 813 |
|  | Middle | 2172 | 1689 |
|  | Bottom | 1749 | 2297 |
| Tray #2 | Top | 1056 | 1300 |
|  | Middle | 1539 | 2382 |
|  | Bottom | 1570 | 1512 |
| Tray #3 | Top | 938 | 1279 |
|  | Middle | 1586 | 2084 |
|  | Bottom | 1328 | 1702 |
| Tray #4 | Top | 719 | 1074 |
|  | Middle | 696 | 679 |
|  | Bottom | 573 | 554 |
|  | Average | 1210 | 1447 |
|  |  | 1329 |  |
|  | Blend | 1420 |  |

TABLE 7

72 pounds of HP410 basic lot (C410-S-128793) was doped with nitrogen to an aim value of 2500 ppm. PLC crashed during the cool down phase. The run was aborted and rerun on 5/11/99. Powder was heated to 740° C. followed by degas, cool down to 325° C. and nitrogen was introduced.

|  | Tray # | Position | Carbon | Oxygen | Nitrogen | Hydrogen |
|---|---|---|---|---|---|---|
| 8187-2-1T | Tray 1 | Top | 45 | 6612 | 1076 | 44 |
| 8187-2-1M | Tray 1 | Middle | 28 | 5705 | 2278 | 29 |
| 8187-2-1B | Tray 1 | Bottom | 38 | 6136 | 2335 | 30 |
| 8187-2-2T | Tray 2 | Top | 48 | 6247 | 2314 | 33 |
| 8187-2-2M | Tray 2 | Middle | 28 | 5646 | 2346 | 27 |
| 8187-2-2B | Tray 2 | Bottom | 42 | 5136 | 2213 | 23 |
| 8187-2-3T | Tray 3 | Top | 51 | 5881 | 2002 | 38 |
| 8187-2-3M | Tray 3 | Middle | 29 | 5618 | 1742 | 26 |
| 8187-2-3B | Tray 3 | Bottom | 35 | 5853 | 1838 | 30 |
| 8187-2-4T | Tray 4 | Top | 56 | 5936 | 946 | 37 |
| 8187-2-4M | Tray 4 | Middle | 26 | 5481 | 664 | 27 |
| 8187-2-4B | Tray 4 | Bottom | 34 | 5869 | 681 | 25 |
| 8187-2-5T | Tray 5 | Top | 53 | 6463 | 1467 | 43 |
| 8187-2-5M | Tray 5 | Middle | 33 | 5706 | 4237 | 27 |
| 8187-2-5B | Tray 5 | Bottom | 39 | 5987 | 3464 | 27 |
| 8187-2-6T | Tray 6 | Top | 44 | 5784 | 2478 | 38 |
| 8187-2-6M | Tray 6 | Middle | 50 | 5743 | 3240 | 21 |
| 8187-2-6B | Tray 6 | Bottom | 39 | 6035 | 3259 | 16 |
| 8187-2-7T | Tray 7 | Top | 42 | 6131 | 2319 | 36 |
| 8187-2-7M | Tray 7 | Middle | 28 | 5708 | 2189 | 26 |
| 8187-2-7B | Tray 7 | Bottom | 35 | 6027 | 2161 | 26 |
| 8187-2-8T | Tray 8 | Top | 58 | 5848 | 1364 | 31 |
| 8187-2-8M | Tray 8 | Middle | 27 | 5624 | 842 | 30 |
| 8187-2-8B | Tray 8 | Bottom | 33 | 5848 | 670 | 19 |
| 8187-2-NB |  | Blend | 36 | 5821 | 2407 | 21 |
|  |  | Avg. | 39 | 5922 | 2001 | 30 |

Nitrogen Analysis for 8187-2-H run

|  |  | Front | Rear |
|---|---|---|---|
| Tray #1 | Top | 1076 | 1467 |
|  | Middle | 2278 | 4237 |
|  | Bottom | 2335 | 3464 |
| Tray #2 | Top | 2314 | 2478 |
|  | Middle | 2346 | 3240 |
|  | Bottom | 2213 | 3259 |
| Tray #3 | Top | 2002 | 2319 |

TABLE 7-continued 72 pounds of HP410 basic lot (C410-S-128793) was doped with nitrogen to an aim value of 2500 ppm. PLC crashed during the cool down phase. The run was aborted and rerun on 5/11/99. Powder was heated to 740° C. followed by degas, cool down to 325° C. and nitrogen was introduced.

|  |  | Middle | 1742 | 2189 |
|---|---|---|---|---|
|  |  | Bottom | 1838 | 2161 |
|  | Tray #4 | Top | 946 | 1364 |
|  |  | Middle | 664 | 842 |
|  |  | Bottom | 581 | 670 |
|  | Average |  | 1695 | 2001 | 2308 |
|  | Blend |  | 2407 |

Ta Powder weight: 70 pounds
Nitrogen aim Value: 2500 ppm
Nitrogen Flow rate: 3 liters/min
Nitrogen addition Time: 24 minutes
Total pressure: 205 torr
Nitrogen Doping Temp.: 325 C. Ramp up @ 1 C./min.
Total Nitrogen absorption time: 176 minutes
Final Temperature achieved: 489° C.

TABLE 8

Nitriding Run 2500 ppm Target.
All batches were deoxed using 0.75% Magnesium @ 850° C.
(100 min soak + 60 min vacuum).
Nitriding parameters 450° C. with 5000 ppm set point @ 2.5
Liters/min. Flow rate. No pressure raise during nitrogen doping.

| | After deox and acid leaching | |
|---|---|---|
| Sample | Nitrogen (ppm) | Oxygen (ppm) |
| 8030-95-M1 | 938 | 2093 |
| 8030-95-M2 | 14670 | 1883 |
| 8030-95-M3 | 20330 | 2429 |
| 8030-95-M4 | 19050 | 2466 |
| 8030-95-M5 | 27190 | 1991 |
| 8030-95-M6 | 17740 | 1767 |
| 8030-95-M7 | 10920 | 2067 |
| 8030-95-M8 | 5621 | 1773 |
| 8030-95-M9 | 2909 | 2373 |
| 8030-95-M10 | 2352 | 2401 |
| 8030-95-M11 | 1546 | 2127 |
| 8030-95-M12 | 1176 | 2052 |
| 8030-95-M13 | 630 | 2870 |
| 8030-95-M14 | 539 | 2191 |

Non-uniform nitrogen observed when nitrogen doping was conducted during its deox process.

TABLE 9

Process
Basic lots were soaked with 34% water.
Water agglomerated with 37% water.
Materials was heat-treated at 1309 spc anode temperature.
Nitrogen was doped before heating up.
Target for Nitrogen doping is 2500 ppm.

|  | Basic lots | Finished Material |
|---|---|---|
|  | 8280-66-b | 8280-67-nm2a |
| Modified FSS (microns) | 0.37 | 2.39 |
| Scott (gms/in3) | 12.3 | 27.8 |
| BET | 2.74 | 1.03 |
| C (ppm) | 46 | 56 |
| O (ppm) | 8682 | 3058 |
| N (ppm) | 43 | 2379 |
| H (pm) | 1482 | 81 |
| Screens |  |  |
| +60 |  | 0 |
| −60/+100 |  | 23.7 |
| −100/+200 |  | 35.2 |

TABLE 9-continued

Process
Basic lots were soaked with 34% water.
Water agglomerated with 37% water.
Materials was heat-treated at 1309 spc anode temperature.
Nitrogen was doped before heating up.
Target for Nitrogen doping is 2500 ppm.

|  | Basic lots<br>8280-66-b | Finished Material<br>8280-67-nm2a |
| --- | --- | --- |
| −200/+325 |  | 14.6 |
| −325/+400 |  | 7.8 |
| −400 |  | 18.7 |
| Flow |  | 103.4 |
| 1335 C. 30 V |  |  |
| Cap (cv/gm) |  | 68,686 |
| DCL (na/cv) |  | 0.27 |
| Fliers |  | 1 |
| Sint. Den. |  | 5.17 |
| Shrinkage |  | 1.81 |

What is claimed is:

1. A sintered nitrided valve metal having a nitrogen content of from about 1,500 ppm to about 4,000 ppm wherein all of said nitrided valve metal powder from the sintering has a uniform nitrogen distribution within 1,500 ppm or less.

2. The nitrided valve metal of claim 1, wherein said valve metal is tantalum.

3. The nitrided valve metal of claim 1, wherein said valve metal is niobium.

4. A nitrided tantalum powder having a nitrogen content of from about 1,500 ppm to about 4,000 ppm and a capacitance, when formed into a capacitor anode at 30 volts, of from about 40,000 CV/g to about 80,000 CV/g, and wherein said nitrided tantalum powder has a flow of from about 70 to about 300 mg/s and has a Scott Density of from about 25 to about 40 g/in$^3$.

5. A capacitor anode comprising the tantalum powder of claim 2.

6. A capacitor anode comprising the niobium powder of claim 3.

7. The sintered nitrided valve metal of claim 1, wherein said nitrided valve metal powder comprises pore sizes of at least 2 microns.

8. The sintered nitrided valve metal of claim 2, wherein said nitrided valve metal powder comprises pore sizes of at least 2 microns.

9. The sintered nitrided valve metal of claim 3, wherein said nitrided valve metal powder comprises pore sizes of at least 2 microns.

10. A capacitor anode comprising the nitrided tantalum powder of claim 4.

11. The nitrided tantalum powder of claim 4 having pore sizes of at least 2 microns.

12. The nitrided tantalum powder of claim 4, wherein said Scott Density is from about 26 to about 32 in$^3$.

13. The nitrided tantalum powder of claim 4, wherein said nitrogen content is from about 2,000 ppm to about 3,000 ppm nitrogen.

14. The nitrided tantalum powder of claim 4, wherein said powder has a BET surface area of from about 1 to about 3 m$^2$/g.

15. The nitrided tantalum powder of claim 4, wherein said nitrided tantalum powder has a BET surface area of from about 0.5 to about 3 m$^2$/g.

16. The nitrided valve metal of claim 1, wherein said nitrided valve metal powder has a BET surface area of from about 0.5 to about 10 m$^2$/g.

17. The nitrided tantalum powder of claim 4, further comprising a phosphorus content, an oxygen content or both.

18. The nitrided tantalum powder of claim 4, further comprising a phosphorus content of from about 50 ppm to about 100 ppm, an oxygen content of from about 1,500 ppm to about 3,500 ppm, or both.

19. The nitrided tantalum powder of claim 4, further comprising a BET surface area of from about 0.5 to about 10 m$^2$/g.

* * * * *